Aug. 25, 1959
H. MEYER
2,900,731
MICROMETER INDICATOR
Filed Sept. 19, 1957
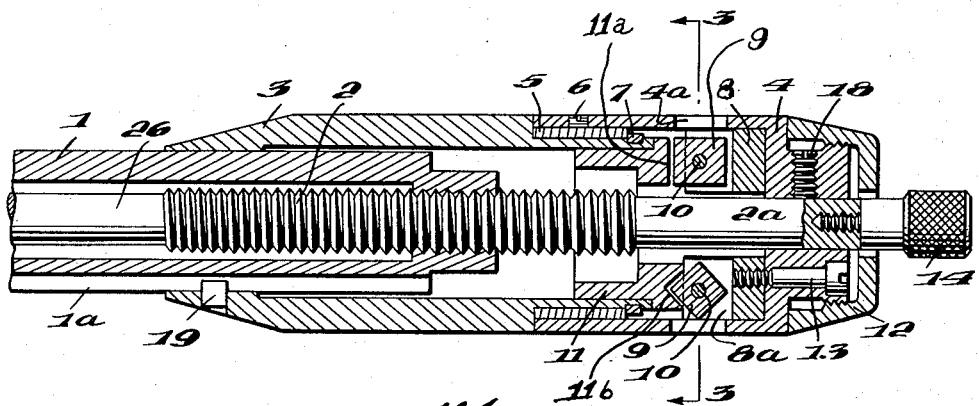
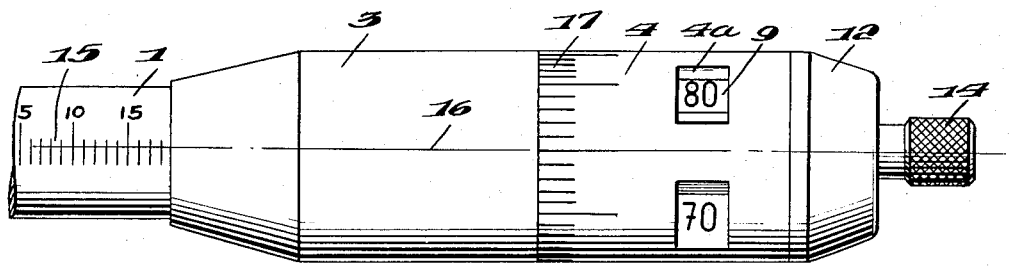
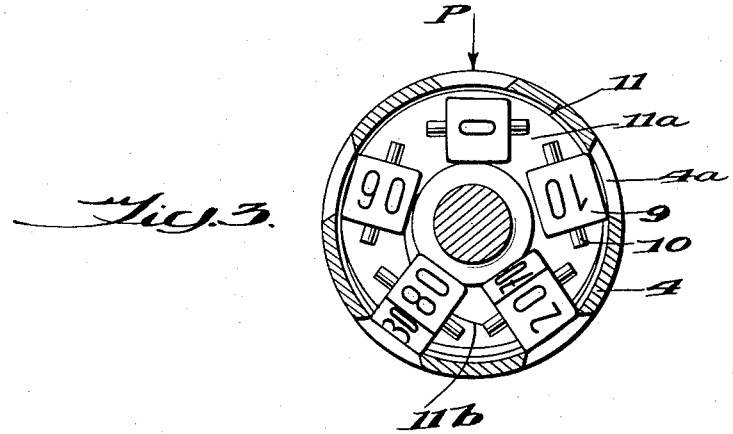
INVENTOR
Hans Meyer
BY Pierce, Scheffler & Parker
ATTORNEYS 2,900,731
Patented Aug. 25, 1959

2,900,731
MICROMETER INDICATOR
Hans Meyer, Renens, Switzerland

Application September 19, 1957, Serial No. 685,003

Claims priority, application Switzerland March 16, 1957

3 Claims. (Cl. 33—166)

This invention relates generally to micrometers for accurately measuring small linear distances, and more specifically to a micrometer screw arrangement having a plurality of cubical indicators which are rotated about their axes by a suitable guide track, said indicators being visible through openings in the micrometer body.

Micrometers of the conventional types of the prior art have the disadvantage that the micrometer screws do not have threads of a pitch corresponding to a full unit of linear distance.

In order to remedy this, several solutions have been proposed in the instruments of the prior art. Some of the prior proposals have suggested arrangements actuated by a so-called Maltese cross, whereas others teach the use of sliding elements carrying numerals actuated by suitable cam means. A further solution proposed is the use of rotating graduated drums located within and visible through openings in the primary drum, the auxiliary drums being driven from the primary drum by suitable gearing.

The objection to the use of the Maltese cross and of standard revolution counters lies in the periodic variations in measuring accuracy due to periodic variations in internal friction as the auxiliary elements are brought successively into view in apertures of the graduated drum. Cam-driven sliding mechanisms have a relatively large amount of frictional resistance and are easily upset by dirt or grit. Gear mechanisms because of the required small size of their components make the instrument not only expensive but also extremely vulnerable to outside influences. The instant invention was developed to eliminate the disadvantages of the instruments of the prior art.

The primary object of my invention is to provide a micrometer indicator in which a plurality of elements carrying numeralled indicia are rotatably located within and visible through openings in the instrument casing, these elements being in contact with a non-rotating, screw-shaped guide track which subjects them to a rotary motion in such a manner that they effect a partial rotation around their own axes when the instrument casing is given a full turn.

These and other objects and advantages of the invention will be apparent from the following specification when taken with the accompanying drawing in which:

Fig. 1 is a central longitudinal section through the measuring end of the micrometer caliper embodying the invention;

Fig. 2 is a corresponding front elevation of the measuring end of the micrometer caliper; and Fig. 3 is an enlarged cross section taken along line 3—3 of Fig. 1.

In the drawing the reference numeral 1 (Figs. 1 and 2) identifies the instrument body in which the micrometer screw 2 having spindles 2a, 2b is rotatably supported in a known manner. By means of the screw 18 a drum 4 is rigidly secured to the cylindrical spindle 2a of the screw 2. A protecting sleeve 12 covers the drum 4.

A sleeve 3 is mounted on the body 1 and is longitudinally slidable with respect thereto. Rotation of the sleeve 3 is prevented by means of key 19 secured thereto which is slidable in key-way 1a cut in the body 1. The sleeve 3 and the drum 4 are connected by means of ring 5 which is locked in position on sleeve 3 by means of the split ring 7 clamped to the drum 4 by means of the screw 6. When the spindle 2 is rotated by the drum 4, the sleeve 3 will not rotate but will only be displaced longitudinally on the body 1.

The cylindrical element 8, which at one end has five axial projections 8a spaced on the perimeter thereof, is inserted in the drum 4 and is held in position by screws 13. Cubical members 9 having numeraled indicia thereon are rotatably supported between the projections 8a of the element 8 by means of pins 10. The axes of rotation of the cubical members 9 are substantially tangential with respect to an imaginary circle swung around the axis of the drum 4 as shown in Fig. 3.

The cubical members 9 are in contact with guide-track 11a which extends axially from guide member 11 which is rigidly secured to the sleeve 3. The guide-track 11a has the general shape of a square thread adapted to receive an edge of a cubical member. The numerals engraved on the members 9 can be read from outside the instrument body through the apertures 4a (Fig. 2).

The drum 4 is provided with a circumferential scale of graduation 17 in known manner, and the mating edge of the sleeve 3 is provided with a reference line 16 against which the graduation 17 can be read. The number of full measuring units can be read on the graduation 15 on the body 1. The micrometer screw is provided with knurled-knob driving means 14 in the usual manner.

When the drum 4 is rotated the cubical members 9 also rotate as they slide along the non-rotating screw-shaped guide-track 11a of the guide member 11. The arrangement is such that the cubical members 9 rotate a quarter turn around their axes when the drum 4 is subjected to a full turn.

Fig. 3 shows the positions of the cubical members 9 relative to part 11 and the guide-track 11a. In order to simplify this drawing, certain non-essential parts have been omitted. The curve of the screw-thread 11b of the guide-track 11a is chosen in such a manner as not to have a gradient at the top half of Fig. 3, so that when in contact with this part of the guide-track, the cubical members 9 will not effect a rotation of their own. Rotation of the cubical members 9 will occur only during the time that the members are in contact with the lower part of the guide-track in Fig. 3. Owing to this arrangement, to an observer looking in the direction of the arrow P at Fig. 3, the three cubical members 9 of the upper part of Fig. 3 in his field of vision will appear to be unmoved relative to the apertures 4a. The rotation of these members around their own axes will occur outside his field of vision and can therefore not be observed.

The choice of the numerals engraved on the cubical members 9 depends on the purpose of the micrometer. Assuming that the thread of the screw 2 has a pitch of 0.5 mm., as is the case in most metric instruments, a full turn of the drum 4 will correspond to an advance of the screw of 0.5 mm. When the drum has 5 apertures, the numerals 0–10–20–30–40 must appear in the same successively when the drum has a circumferential scale of 50 graduation lines. When the drum is given a second turn the consequence will be that the numerals 50–60–70–80–90 will appear and when the drum is rotated anew the sequence will be repeated. It will be clear that the cubical members 9 must have identical numerals on each opposite side, so that, for instance, the upper member in Fig. 3 has numerals in the following sequence 0–50–0–50, For British units of linear measurement corresponding other numerals must be chosen.

The mass of the cubical members is very small and therefore the acceleration and braking forces which occur during rotation are insignificant and will be without influence on the measured result. Because of the simple assembly, the arrangement described is cheap to manufacture and requires practically no maintenance.

While in accordance with the patent statutes I have illustrated and described the best form of embodiment of my invention known to me, it will be apparent to those skilled in the art that certain changes may be made in the form of the apparatus described without departing from the spirit of my invention as set forth in the appended claims.

I claim:

1. In a micrometer indicator having a body and a micrometer screw threadably connected thereto, a cylindrical drum rigidly secured to said micrometer screw coaxially with respect thereto, said drum having a plurality of apertures on the periphery thereof, a plurality of cubical members having indicia thereon rotatably mounted within said drum adjacent said apertures, said cubical members being rotatable about axes substantially tangential with respect to an imaginary circle concentric with the longitudinal axis of said drum, a sleeve rotatably connected to said drum and slidably connected to said micrometer body, said sleeve being keyed to said body to prevent relative rotational movement therebetween, said sleeve having a guide track thereon in engagement with said cubical members for causing partial rotation of said cubical members upon a full turn of said drum and said micrometer screw relative to said body.

2. A micrometer indicator as defined in claim 1 wherein the guide track has the general shape of a square thread adapted to receive an edge of said cubical members.

3. A micrometer indicator as defined in claim 2 wherein said guide track has no gradient on a part of its perimeter so that no rotation of the cubical members will be effected while in contact with that part of the guide track.

References Cited in the file of this patent

UNITED STATES PATENTS 2,644,240  Stedman _____ July 7, 1953